United States Patent Office 3,338,461
Patented Aug. 29, 1967

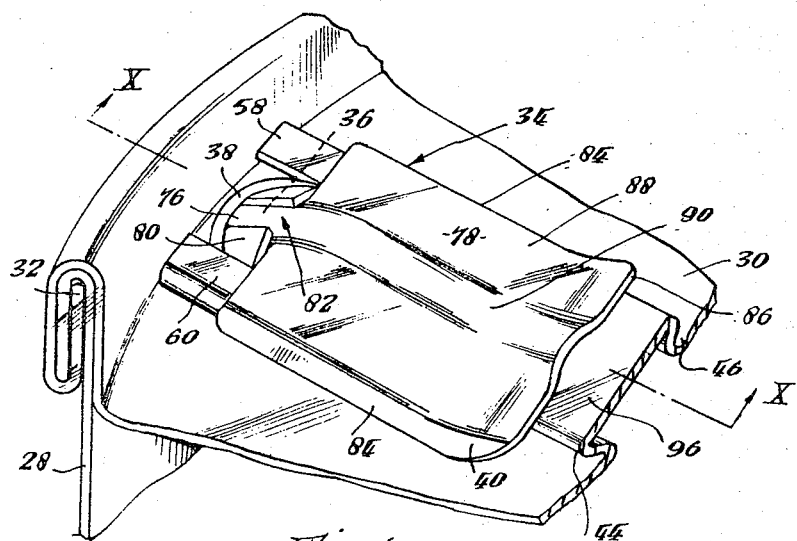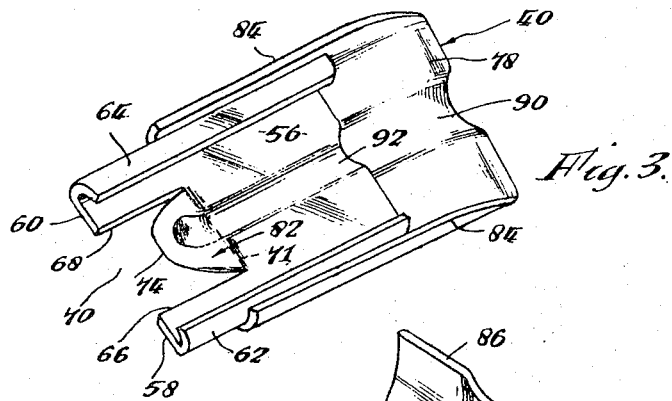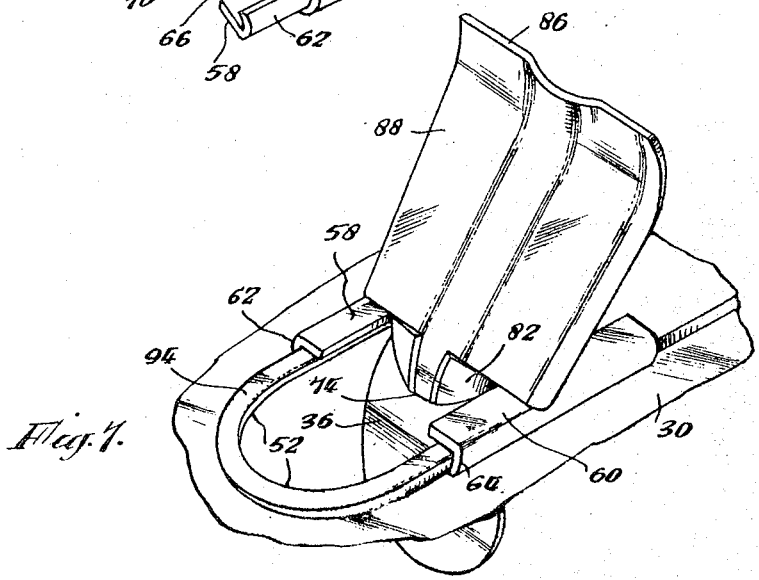

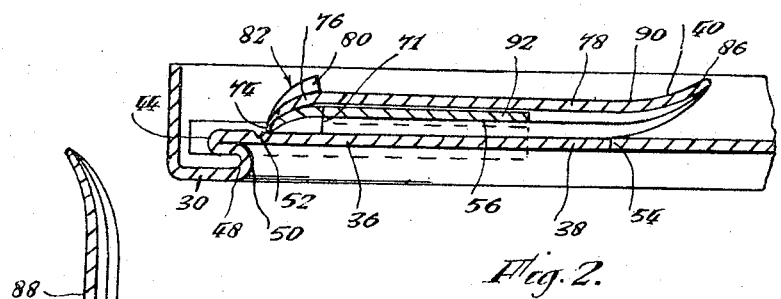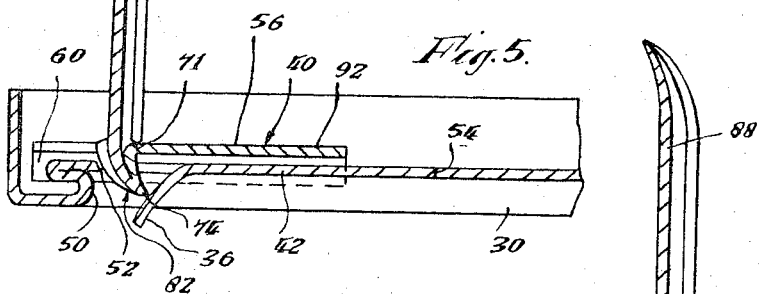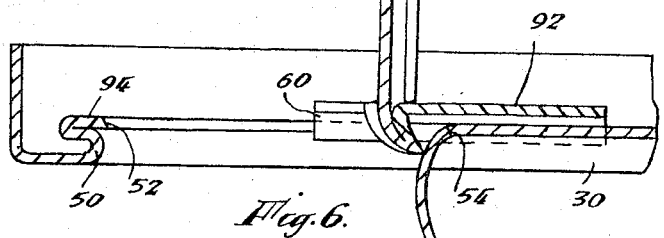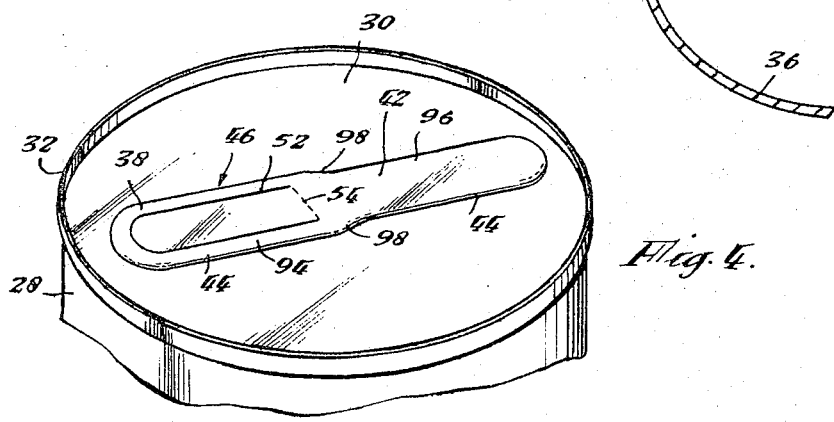

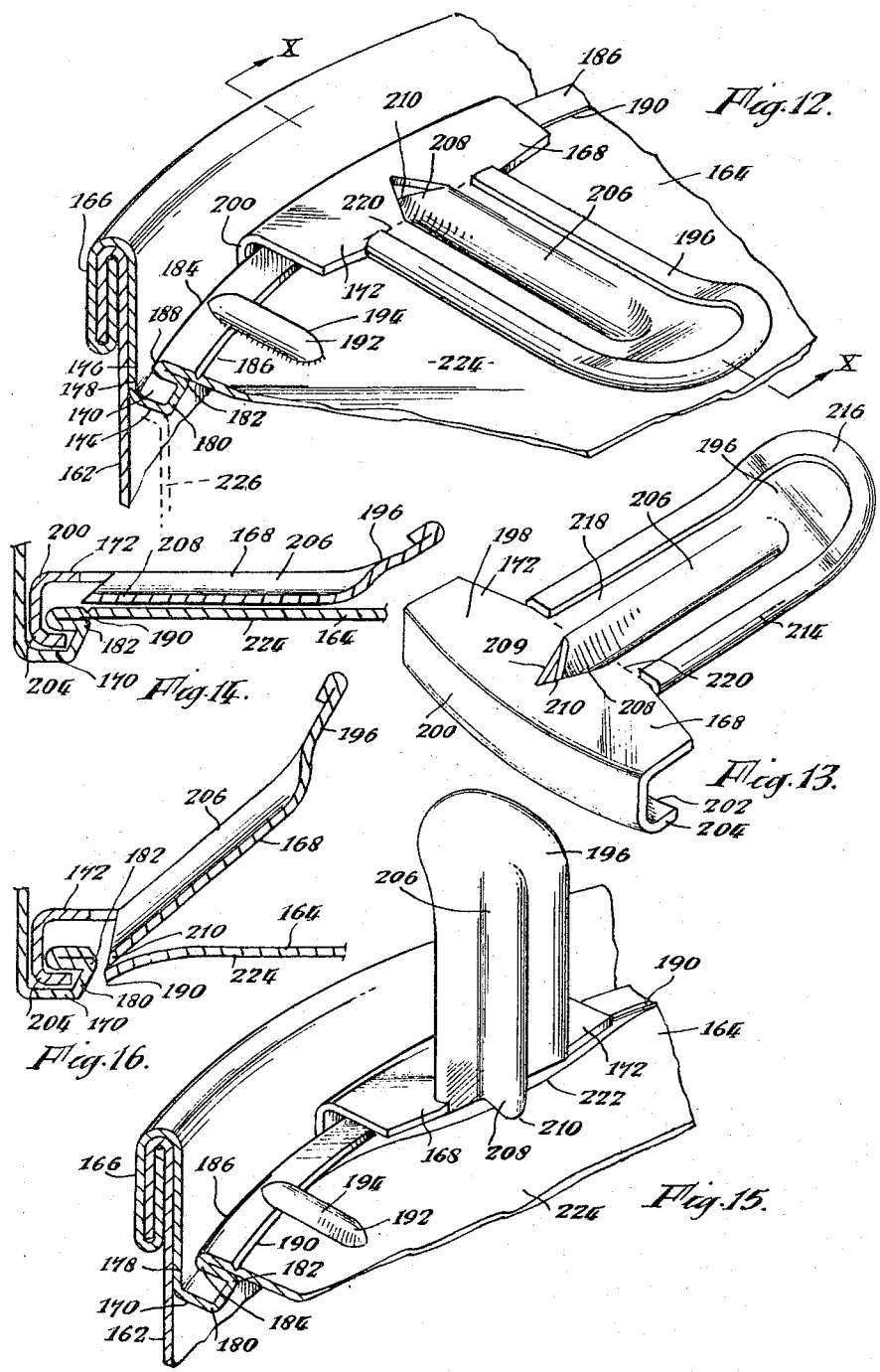

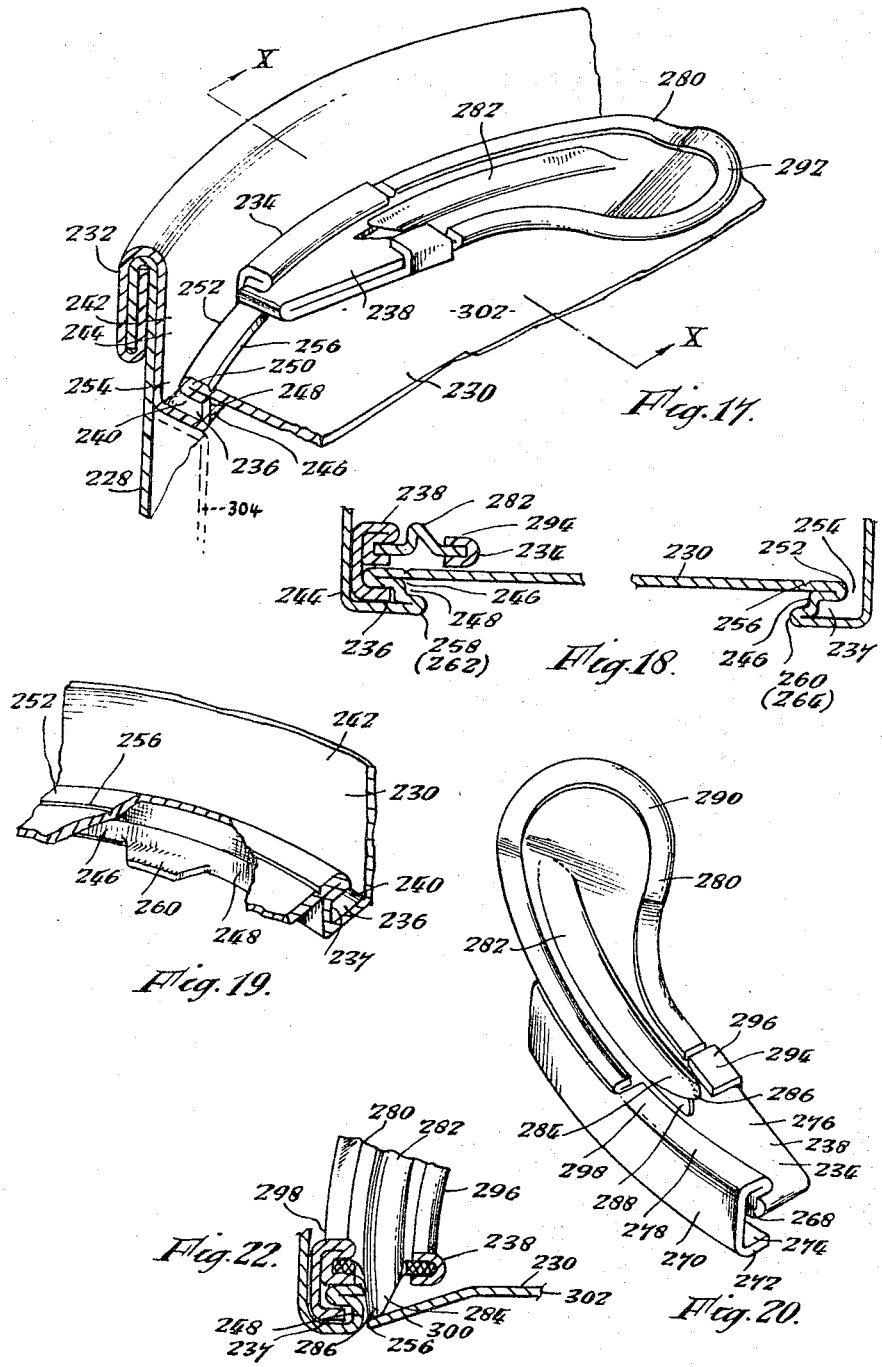

3,338,461
CONTAINERS
William Cookson, Fareham, England, assignor to Cookson Sheet Metal Developments Limited, Southampton, England, a company of Great Britain and Northern Ireland
Filed Jan. 21, 1966, Ser. No. 522,100
Claims priority, application Great Britain, Apr. 8, 1965, 14,930/65; June 14, 1965, 24,962/65; June 24, 1965, 26,888/65; July 26, 1965, 31,910/65; Oct. 11, 1965, 43,060/65; Nov. 12, 1965, 48,100/65; Dec. 14, 1965, 53,031/65
18 Claims. (Cl. 220—48)

This is a continuation-in-part of U.S. application Ser. No. 473,623 filed July 21, 1965.

This invention relates to containers and container walls having means provided for their easy opening. It is more particularly, though not exclusively, concerned with container lids formed of relatively stiff thin sheet material provided with easily operated opening means. In one particular embodiment, the invention relates to a container having a lid formed of tin plate having hand operable opening means.

It has long been recognized as a problem in containers to provide opening means which may be operated by hand without the use of tools. The problem has arisen both in connection with finding a means of making a large opening in a container by removing substantially the whole of one wall, e.g. the lid, and also in connection with finding a means for making a smaller opening so as to allow the removal of solid or liquid contents, e.g. by pouring.

It has been regarded as a particularly difficult problem to provide hand operated means for opening tin plate containers without the use of tools.

It is an object of the present invention to provide a solution to these problems.

It is another object of the invention to provide a container wall having opening means that are easily operated by hand without the use of tools.

It is another object of this invention to provide a container wall having a runway element and a slider opening device mounted on the runway element which can be slid along the runway element by hand to open the container. In this manner, a portion of the container wall may be completely removed or a portion may be partially separated from the remainder of the wall and so be bent away to allow the container to be emptied.

It is a further object to provide a weakened portion of the material of the wall on or adjacent to the runway element, e.g. in the form of a scored or coined line along which the material may be separated by use of the slider opening device.

It is a further object to provide the slider opening device with camming means which can apply pressure to the material along or adjacent to the weakened portion to cause the separation.

It is a further object to provide a shoulder against which the material may be urged by the camming means to assist in the opening.

It is a still further object of the invention to provide a container having a lid, especially a lid formed of tin plate, having hand operable opening means.

It is a still further object of the invention to provide opening means for a wall of the container assembled during the normal course of manufacture of the container wall.

According to one aspect, this invention provides a container wall formed of relatively thin sheet material, having opening means comprising
a runway element;
a slider opening device engageable therewith to slide therealong; and
camming means provided on the slider opening device engageable with the material of the wall to exert pressure theron to part the material along a line when the slider opening device is slid along the runway.

According to another aspect this invention provides in a container wall formed of relatively thin sheet material, opening means comprising
a runway element;
a slider opening device engageable therewith to slide therealong;
a portion of the sheet material weakened along a line; and
camming means provided on the slider opening device engageable with the material of the wall in the neighborhood of the weakened portion to exert pressure thereon to part the material along the said line when the slider opening device is slid along the runway. The said portion of the sheet material weakened along a line may be situated either on or adjacent the runway element.

The container wall may be formed of light gauge material, e.g. tin plate, aluminium or plastics.

According to yet another aspect the invention provides in a container wall formed of relatively thin sheet material, opening means comprising
a runway element formed in the sheet material;
a slider opening device engageable with the runway element to be slid therealong;
a portion of the material of the wall adjacent the runway element weakened along a line; and
camming means provided on the slider opening device engageable with the material at or near the weakened portion to exert pressure thereon to part progressively the said line as the slider opening device is slid along the runway.

According to yet another aspect the invention provides in a container wall formed of relatively thin sheet material, opening means comprising
a runway element formed in the sheet material;
a slider opening device mountable on the runway element to slide therealong;
a part of the runway element partially bounded by a weakened line formed in the material; and
camming means provided on the slider opening device engageable with the said part of the runway element adjacent the weakend line to exert pressure thereon and part progressively the weakened line as the slider opening device is slid along the runway element.

According to another aspect, the invention provides a container which includes a container wall, e.g. a lid according to the invention.

According to a further aspect the invention provides a container formed of relatively stiff thin sheet material having an opening device comprising a slider runway and a slider, the slider having means for progressively parting the material of the container along a weakened line formed on or adjacent to the runway as the slider is slid along the runway.

The means for progressively parting the material of the container may comprise camming means arranged to engage the material in the region of the weakened line and cause it progressively to part. In this event, material bordering the weakened line may be supoprted on one side of said material by a shoulder, the camming means being arranged on the other side to force the material against the shoulder progressively to part the weakened line as the slider is slid along the runway. The shoulder may be provided by a portion of the runway element.

The invention further provides a container having a lid provided with an opening device comprising a runway element;
a slider opening device engageable therewith to slide therealong;
a portion of the sheet material weakened along a line; and
camming means provided on the slider opening device engageable with the material of the lid in the neighbourhood of the weakened portion to exert pressure thereon to part the material along the said line and to bend a part of the lid towards another wall of the container when the slider opening device is slid along the runway.

The runway element may encircle a central portion of the lid and the weakened portion of the sheet material may be formed along a line inwardly of the runway element so as to have a break in the line at one point whereby when the material has been parted along the whole of the line, the camming means by pressure on the material bends a part of the lid into the container and a part on the opposite side of the break in the line out of the container. Preferably, a bead is formed in the material at the break in the weakened portion, this conveniently forming a stop for the slider opening device.

In a modification the runway element may encircle a central portion of the lid and the weakened portion of the sheet material may be formed along a line inwardly of the runway element, with the runway element below the weakened line having pivoted means so that when the camming means exerts pressure on the material as it moves round the runway part of the lid is bent into the container on one side of the pivoted means and the other part of the lid rotates upwardly out of the container.

It is a further object of the invention to provide a slider opening device preferably formed in one piece, one part of which is hinged on the other and on which is formed camming means which are adapted to exert pressure on a portion of a container wall as the one part is hinged about the other by lifting. By use of such a slider opening device the material of the wall can be separated along a part of a pre-formed line or lines, e.g. an openable portion can be separated from the remainder of the wall along a pre-formed line or lines by lifting one part of the opening device and can then be further separated along the pre-formed line or lines by moving the slider opening device along the runway.

The lid may be formed of light gauge material, e.g. tin plate, aluminium or plastics. The weakened portion or line in containers and container walls according to the different aspects of the invention may be formed by scoring or coining either on one or on both sides of the material.

Other objects will be apparent from the following description wherein several embodiments of the invention are described by way of example only with reference to the accompanying drawings in which:

FIG. 1 is a part perspective view of opening means for opening part of the lid of a container with its slider opening device in the non-operative position;

FIG. 2 is a part cross-section view of the opening means shown in FIG. 1, taken on the line X—X;

FIG. 3 is a perspective view from below of the slider device shown in FIGS. 1 and 2;

FIG. 4 is a view of the container with the opening means in the lid, the slider device being omitted;

FIG. 5 is a part cross-section view of the opening means taken on the line X—X in FIG. 1 but with the slider device in its first operative position;

FIG. 6 is a part cross-section view of the opening means similar to FIG. 5 but with the slider device in its second operative position;

FIG. 7 is a part perspective view of the opening means during the process of opening the container;

FIG. 12 is a part perspective view of opening means for opening the lid of a container with its slider in the non-operative position;

FIG. 13 is a perspective view of the slider shown in FIG. 12;

FIG. 14 is a part cross-section view of the opening means shown in FIG. 12 taken on the line X—X;

FIG. 15 is a part cross-section view of the opening means shown in FIG. 12 but with the slider device in its operative position;

FIG. 16 is a part cross-section view of the opening means shown in FIG. 15;

FIG. 17 is a part perspective view of opening means for opening the lid of a container with a modified slider shown in the non-operative position;

FIG. 18 is a part cross-section view of the opening means partly shown in FIG. 17;

FIG. 19 is a part perspective view of one of the pivoting means;

FIG. 20 is a perspective view of the slider device shown in FIG. 17;

FIG. 22 is a part cross-section view of the opening means shown in FIG. 21.

Figure 8:
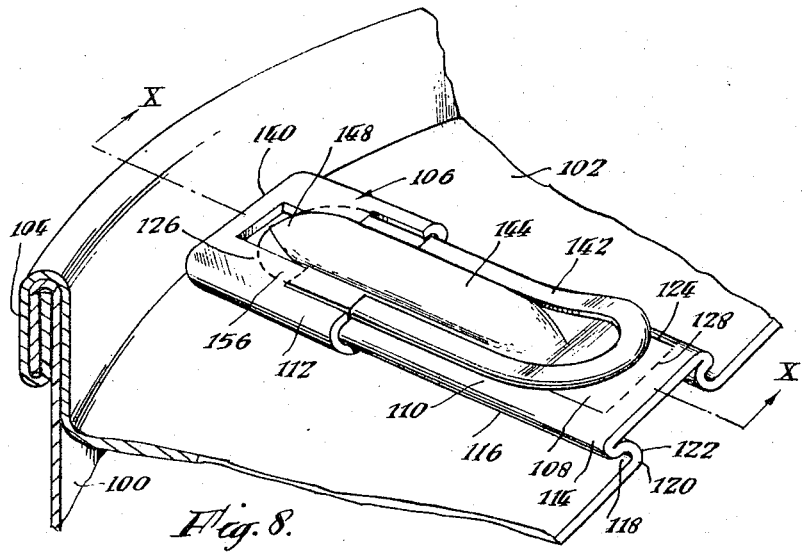
FIG. 8 is a part perspective view of opening means for opening part of a lid with a modified form of slider opening device in the non-operative position.

In FIGS. 1 and 2 there is shown a container having a body 28 and a lid 30 made of tinplate, aluminum, or other suitable relatively stiff thin sheet material, joined by a conventional seam joint 32. Opening means for the lid 30 generally indicated at 34 in FIG. 1 comprise an openable portion 36, a runway element 38, and a slider opening device 40.

In FIGS. 1 to 4, the openable portion 36, which is formed integrally in the lid 30, comprises part of a panel 42 press formed in the lid having inwardly bent edges 44 to provide a runway track 46. The material is reversibly bent at 48 forming shoulders 50 and joining the material of the remainder of the lid 30. A scored or coined line 52 having a central curved portion joining two straight portions is made in the panel 42 above the edges of the shoulders 50. The line 52 defines an edge of the openable portion 36 and forms a weakened portion of the material of the lid on the runway element. In tinplate, scoring will preferably be used for the line 50; in aluminum, coining may be used. The dotted line 54 in FIG. 4 represents a line at which the openable portion 36 will bend or hinge as hereinafter described.

In the embodiment illustrated the line 54 comes at a point on panel 42 covered by the slider opening device 40.

Instead of forming the scored or coined line 52 in the position shown in the figures, i.e. in the upper surface of the panel 42, the line may alternatively be made above the edges of the shoulders 50 but on the underneath surface of the panel 42 or a line may be made on both sides of the material.

Referring to FIGS. 1 to 3, the slider opening device 40 is made from a single blank of tinplate, aluminum, or other suitable material. It comprises an inner wall 56 having inwardly turned sides 58 and 60 providing respectively engagement means 62 and 64 in the form of opposed channel elements. The forward ends of sides 58 and 60 touch the rim of the container in the position shown in FIG. 1. The wall 56 is cut away at sides 66 and 68 to provide an opening 70 which extends as shown in FIG. 3 to a line 71 referred to as bend line 71. At bend line 71 a central part of wall 56 is forwardly and slightly downwardly bent and then reversibly bent at an edge 74 to provide firstly a double hemmed portion 76 (FIGS. 1 and 2) and secondly an outer wall 78 overlying inner wall 56. Corners 80 of the double hemmed portion 76 are bent over as shown in FIGS. 1 and 2 to enable a rounded shape to be given to the edge 74 and to strengthen the portion 76. The portion 76 so shaped provides camming means 82 for the slider opening device. If the material of the slider opening device is brittle, it may be desirable to form a hole in the web of material joining walls 56 and 78 to come at the centre of the edge 74. This assists in the bending operation and helps to prevent cracking at this point.

In an alternative embodiment, walls 56 and 78 with the necessary extensions to form the camming means may be made separately and spot welded or otherwise secured together at the position of edge 74.

The outer wall 78 has sides provided with downturned edges 84 lying close to the surface of the lid 30 when the slider opening device is in the non-operative position and an upturned end 86 capable of passing over the runway element 38 and allowing the user to slide his fingers underneath to raise the wall 78. The end 86 may have a hemmed edge (not shown) to prevent damage to the user's fingers. The wall 78 thus provides a handle 88 for the slider opening device. For strengthening purposes, the wall 78 has a central longitudinal bead 90 extending to the edge 74 of the portion 76 and the inner wall a corresponding central longitudinal bead 92. As the handle 88 is raised by the user, the wall 78 remains rigid with camming means 82 which together bend with respect to the inner wall 56 about the bend line 71.

The slider device 40 is preferably fitted to the lid in the course of manufacture of the lid while this is being press-formed in suitable tools.

Referring to FIGS. 1 to 4, the engagement means 62 and 64 of the slider 40 are so dimensioned as to make a reasonably easy sliding fit on a left-hand portion 94 of the runway element 38. A right-hand portion 96 of the runway element 38 extends the runway substantially across the lid of the container as shown in FIG. 4. A runway element extending substantially across the lid or other wall makes it easier to avoid wrinkling of the surface of the sheet material during manufacture although a shorter runway element, e.g. a runway corresponding in length to the portion 94, could less preferably be used. The portion 96 is of narrower width than the portion 94 and while the engagement means 62, 64 engage the portion 94 (with a reasonably easy sliding fit) they are spaced sufficiently in relation to the width of the portion 96 to be capable of being loosely clipped on to the portion 96 during manufacture of the lid. The slider device 40 is then slid to the left (as would be seen in FIG. 4) to the position shown in FIG. 1 so that the engagement means slide over the portion 94, being guided, if necessary, by curves 98 joining the portions 94 and 96. The rim of the container forms a stop. When overlying the portion 94, the slider device 40 protects from damage the weakened portion of the panel 42. The camming means 82 is so proportioned in relation to the curved end of the scored or coined line 52 in panel 42 that by pivoting the handle 88 and camming means 82 round the bend line 71 with respect to the inner wall 56, when the slider opening device is in the position shown in FIG. 1, the edge 74 of the camming means 82 can be brought into contact with the panel 42 around the inside of the curved portion of the scored line 52. The point of contact is on an unsupported side of the scored or coined line, the panel 42 on the other side of the scored line being supported from underneath by the shoulder 50. Shoulder 50 also assists in reinforcing the construction of the opening device.

A first step in the process of opening the container is shown in FIG. 5.

The handle 88 of the slider opening device 40 is lifted by hand so that together with the camming means 82 it hinges with respect to the inner portion 56. In this process, the material of the device bends about the bend line 71 in the inner wall 56 as shown in FIG. 5. The camming means 82 is thus brought into contact with the panel 42 as the handle 88 is raised. The edge 74 of the camming means 82 exerts pressure on the curved end of the openable portion 36 near the portion of the panel weakened by the line 52 causing the material of the panel 42 to part along the curved portion of the line 52. The shoulders 50 provide the panel 44 outside the line 52 with means of resistance against bending and thus facilitate the rupture of the material along the line.

When the handle 88 has been raised fully as shown in FIG. 5, it can conveniently be urged towards the centre of the lid 30 by hand pressure and this operation forms the next step in the opening process, illustrated in FIGS. 6 and 7.

As the handle 88 is moved towards the centre of the lid, the engagement means 62 and 64 slide freely on the portion 94 of the runway element 38. The camming means 82 progressively forces downwardly the openable portion 36 against the shoulders 50 and causes the material of the panel 42 to part progressively along the opposite branches of the scored or coined line 52. The openable portion 36 bends downwardly below the lid 30 and when the material has parted along the full length of the line 52, it remains bent downwardly approximately from the line 54. At the same time, the slider device 40 is prevented from further sliding movement by the camming means 82 jamming against the downbent portion 36.

A part or the whole of the contents of the container may then be emptied through the opening left in the panel 42 by the openable portion 36.

If desired, the slider opening device may be used to close the opening thus enabling the container to be used after being opened. For this, the handle 88 is preferably returned to the non-operative position by bending it downwardly so that the downturned edges 84 (FIG. 1) again lie close to the surface of the lid 30 and the camming means reverts to the non-operative position. The slider opening device is then slide back along the runway element 38 until the forward ends of the sides 58 and 60 of the wall 56 touch the rim of the can as shown in FIG. 1. The slider opening device will in this position cover the opening that has been made because the line 54 marking the end of the opening comes beneath the slider opening device.

In FIG. 8 there is shown a container having a body 100 and a lid 102 made of tinplate, aluminium or other suitable relatively stiff thin sheet material joined by a conventional lock seam joint 104. Opening means for the lid 102 generally indicated at 106 comprise a openable portion 108, a runway element 110 and a slider opening device 112.

Figure 10:
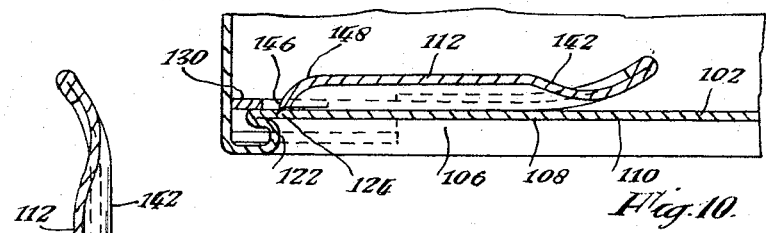
FIG. 10 is a part cross-section view of the opening means shown in FIG. 8 taken on the line X—X.
Figure 11:
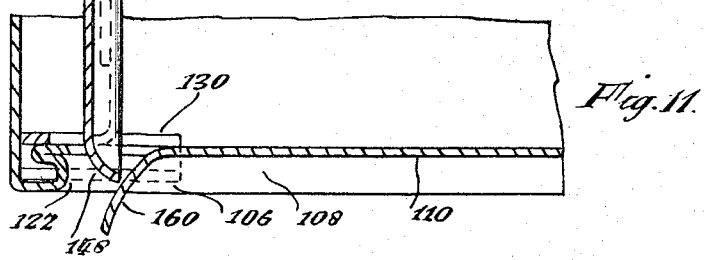
FIG. 11 is a part cross-section view of the opening means similar to FIG. 10 but with the slider device in its operative position.

The opening portion 108 is FIGS. 8, 10 and 11 is formed integrally in lid 102 extending partly across the lid in a radial direction and it comprises part of a panel 114 press formed in the lid having inwardly bent edges 116 to provide runway tracks 118 and reversibly bent edges 120 to provide shoulders 122. A scored or coined line 124 having a central curved portion 126 joining two straight portions is made in the panel 114 above the edges of the shoulders 122. The line 124 defines an edge of the openable portion 108 and forms a weakened portion of the material of the lid on the runway element. In tinplate, scoring will preferably be used for the line 124; in aluminium, coining may be used. Line 124 alternatively or in addition may be scored or coined in the underside of panel 114 against shoulders 122. The dotted line 128 represents a line at which the openable portion 108 will bend or hinge as hereinafter described.

Figure 9:
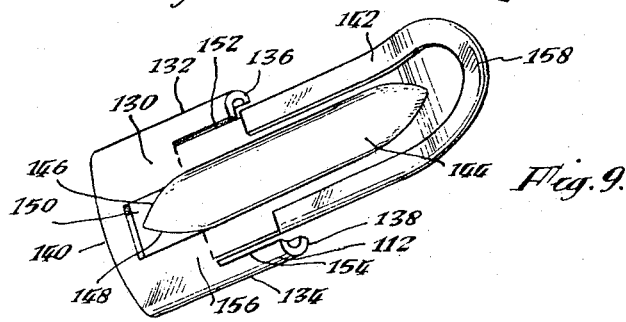
FIG. 9 is a perspective view of the slider shown in FIG. 8.

Referring to FIGS. 8 and 9 the slider opening device 112 is made from a single blank of tinplate, aluminium or other suitable material. It comprises a wall 130 having inwardly turned sides 132 and 134 providing respectively engagement means 136 and 138 in the form of opposed channel elements. The forward end 140 of wall 130 touches the rim of the container in the position shown in FIG. 8. The wall 130 is extended in the form of a handle 142. In the centre of wall 130 and handle 142 is press formed a stiffening bead 144, a front end 146 of which is preferably made to a semi-pointed end to provide camming means 148. The material of wall 130 in the vicinity of the end 146 of bend 144 is cut away to provide an opening 150. Two narrow slots 152 and 154 are provided in wall 130 parallel to and a short distance from sides 132 and 134. A bend line 156 (shown dotted) provides a hinge for handle 142 at the ends of slots 152 and 154. Handle 142 is provided with a hemmed edge 158 as shown. The end of handle 142 is upwardly curved to allow the users' fingers to pass under it when operating the opening device.

Preferably during the course of manufacture of the lid the slider opening device 112 is slid on a runway element 110, the channels of engagement means 136 and 138 engaging in the runway tracks 118 to take up the position in FIGS. 8 and 10. Lid 102 is then secured to the container body 100 by the lock seam 104. The semi-pointed edge of camming means 148 is thus positioned above the openable portion 108 on the unsupported side of scored line 124.

To open the opening device handle 142 is first lifted by hand so that it hinges at bend line 156 with respect to wall 130. In this process the end 146 of the camming means 148 exerts pressure on the curved end 126 of the openable portion 108 near the portion of the panel weakened by the scored line 124 causing the material of the panel to part along the curved portion of the line 124. The shoulder 122 provides the panel 114 outside the line 124 with means of resistance against bending and also provides an abutment against which the scored line is broken through. Shoulder 122 also assists in reinforcing the construction of the opening device.

When handle 142 has been raised fully as shown in FIG. 11 it can conveniently be urged in the direction of the arrow towards the centre of lid 102 by hand pressure, this step being the next operation in the opening process.

As handle 142 is moved towards the centre of the lid the engagement means 136 and 138 slide freely on the runway element 110. The camming means 148 progressively forces downwardly the openable portion 108 against the shoulders 122 and causes the material of the openable portion to part from the remainder of the panel 114 progressively along the scored line 124. The openable portion 108 bends downwardly below the lid 102 and when the material has parted along the full length of the scored line 124 it remains bent downwardly approximately from the line 128. At the same time, the slider device 112 is prevented from further sliding movement by the camming means 148 jammed against the fully down bent portion 160.

A part or the whole of the contents of the container may then be emptied through the opening left in the lid by the openable portion 108.

In FIGS. 12 and 14, a container body 162 and a lid 164 are made from light gauge material such as tinplate, aluminium, or plastics. Lid 164 is secured to body 162 by means of a lock seam 166. An opening device 168 provided in lid 164 comprises a slider runway 170 and a slider opening device 172.

The runway 170 comprises a channel 174 at the base of rim 176 with the rim forming an outer wall 178. The inner wall 180 is provided with a shoulder 182 and a ledge 184 providing slider engagement means 186 spaced from rim 176 by a gap 188. The material of lid 164, above shoulder 182, is partly cut through by a scored line 190. This partial cut may be in the upper surface of lid 164 as shown or in the underneath surface. Alternatively, particularly for easily rupturable material, a coined line may be made in place of the scored line. A stiffening bead or rib 192 provides a stop 194 for slider 172. The bead 192 is left unscored.

In FIGS. 12 and 13 opening device 168 comprises a slider device 172 and a tab handle 196 made from tin plate, aluminium, plastics, or other suitable material. A base wall 198 has a curved side 200 with a inturned lip 202 to provide sliding engagement means 204 with engagement means 186 of lid 164. Tab handle 196 is provided with a bead 206 one end of which provides camming means 208 having a pointed end 210. A clearance round camming means 208 is provided by gay 209 in wall 198. The edges of tab handle 196 are inwardly turned to provide hemmed edges 214, with the end of the handle upturned to provide a finger grip 216. The dotted lines 218 denote hinge portions 220. Slider 172 is assembled in lid 164 as shown in FIGS. 12 and 14, with its engagement means 204 slidably fitted over engagement means 186. Preferably rim 176 is slightly swaged outwardly to allow easy fitting of slider 172 and it is reclosed after the slider is assembled.

Lid 164 is next secured to container body 162 by means of lock seam 166.

To operate the opening device 168 the tab handle 196 when in a position near to the bead 192 is upwardly rotated about hinge portions 220 as shown in FIGS. 15 and 16. In the process camming means 208 exerts pressure on the surface of the lid and against scored line 190 and its pointed end 210 causes the scored line to be punctured locally against shoulder 182 (see FIGS. 15 and 16). As tab handle 196 assumes its upright position camming means 208 comes to rest on the bent down portion of the lid as shown in FIG. 15.

As shown in FIG. 15, because edge 222 of the removable portion 224 of the lid 164 is semi-flexible it assumes a temporary form in which the edge is bent at a slight angle to shoulder 182. This process parts the edge 222 against the shoulder in a shearing action. As slider 172 is slid round runway 170 this process continues, the scored line 190 being progressively broken through as camming means 208 presses downwardly on the surface of the removable portion 224 adjacent to the edge 222. In this manner the slider is enabled to pass freely round the rim of the lid with the minimum of force from the user. It is emphasised that the process is not that of cutting through the material of the lid with a cutting device, as except for the initial puncturing of the scored line by the camming means, the scored line is parted by surface pressure on the removable portion of the lid.

The removable portion 224 of lid 164 is progressively bent down into container body 162 as slider 170 parts scored line 190 until the slider camming means 208 reaches the opposite side of the beaded stop 194 from which it started. At this position the downward pressure of camming means 208 causes the stop 194 to twist slightly along its length which action in turn semi-rotates the removable portion 224 of the lid about its diameter so tending to lift a part of the said portion clear of runway 170, and out of the container body.

An alternative shape 226 is shown for the container mouth in FIG. 12.

In FIGS. 17 and 18, a container body 228 and a lid 230 are made from light gauge material such as tinplate, aluminium, or plastics. Lid 230 is secured to body 228 by means of a lock seam 232. A modified opening device 234 provided in lid 230 comprises a slider runway 236 and track 237 and a slider 238.

The runway 236 comprises a channel 240 at the base of rim 242 with the rim forming an outer wall 244. The inner wall 246 is provided with a shoulder 248 and a ledge 250 providing slider engagement means 252 spaced from rim 242 by a gap 254. The material of lid 230 above shoulder 248, is partly cut through by a scored line 256. This partial cut may be in the upper surface of lid 230 as shown, or in the underneath surface. Alternatively, particularly for easily rupturable material, a coined line may be made in place of the scored line.

In FIG. 18 two diametrically opposite ledges 258 and 260 are provided on inner wall 246 to provide pivoting means 262 and 264. Also see FIG. 19.

In FIGS. 17 and 20 the slider 238 is provided with a tab handle and is made from tinplate, aluminium, plastics, or other suitable material. A base wall 268 has a curved side 270 with an inturned lip 272 to provide engagement means 274 slidably engageable with engagement means 252 of lid 230. Wall 268 is reversibly bent and folded back on itself to provide an overlying wall 276 which is secured to wall 268 by a seamed edge 278 bent from the curved side 270. Seamed edge 278 extends half way along side 270.

Wall 276 is provided with a tab handle 280. Tab handle 280 is provided with a bead 282 one end of which provides camming means 284 having a pointed end 286. A clearance round camming means 284 is provided by gap 288 in walls 268 and 276. The edges of tab handle 280 are inwardly turned to provide hemmed edges 290 with the end of the handle upturned to provide a finger grip 292. A tab 294 secures the free edges of walls 268 and 276. The ends of secured edge 278 and tab 294 provide buttresses 296 and 298 against which handle 280 can be upwardly bent so as to hinge. Slider 238 is assembled in lid 230 as shown in FIGS. 17 and 18, with its engagement means 274 slidably fitted over engagement means 252. Preferably rim 242 is slightly swaged outwardly to allow easy fitting of slider 238 and and it is reclosed after the slider is assembled.

Lid 230 is next secured to the container body 228 by means of the lock seam 232.

Figure 21:
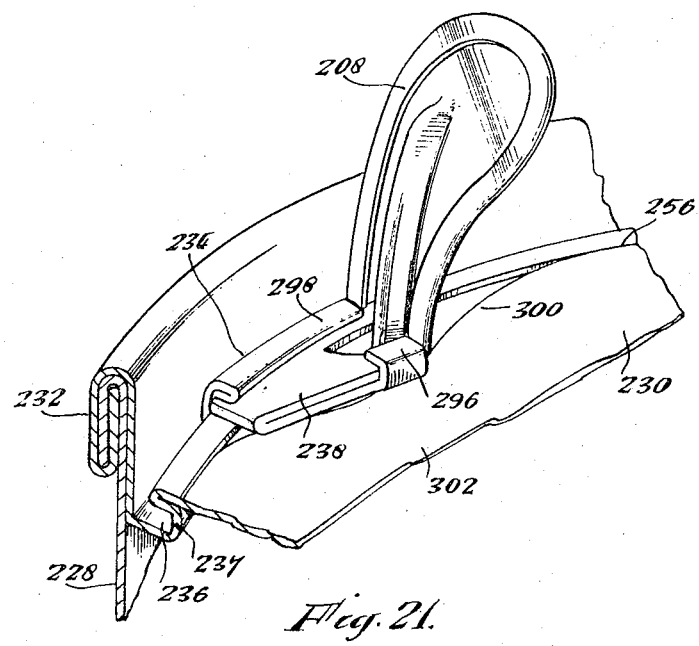
FIG. 21 is a part perspective view of the opening means shown in FIG. 17 but with the slider device shown in its operative position.

To operate the opening device 234 the tab handle 280 is upwardly rotated against buttresses 296 and 298 as shown in FIGS. 21 and 22. In the process camming means 284 exerts pressure on the surface of the lid and against scored line 256 and its pointed end 286 causes the scored line to be punctured locally against shoulder 248 (see FIG. 21). As tab handle 280 assumes its upright position camming means 284 comes to rest on the bent down edge portion 300 of a removable portion 302 of the lid as shown in FIG. 22.

As shown in FIG. 21 because the edge portion 300 of the removable portion 302 of the lid 230 is semi-flexible it assumes a temporary form in which the edge is bent at a slight angle to shoulder 248. This process parts the line 256 against the shoulder in a shearing action. As slider 233 is slid around runway track 237 this process continues, the scored line 256 being progressively broken through as camming means 284 presses downwardly on the surface of the edge portion 300. In this manner the slider is enabled to pass freely round the rim of the lid with the minimum of force from the user. It is emphasised that the process is not that of cutting through the material of the lid with a cutting device, as except for the initial puncturing of the scored line by the camming means, the scored line is parted by surface pressure on the removable portion of the lid.

This removable portion 302 of lid 230 is progressively bent down into container body 228 as slider 238 parts scored line 256. After passing halfway round the runway the removable portion 302 hinges on the pivoting means 262 and 264, causing it so to semi-rotate about this axis. This action tilts the severed half of the lid upwards from the container so enabling it to be easily removed.

If it is desired to have a container body which has a completely smooth interior except for the ledges 258 and 260 the mouth of the container may be suitably shaped as shown by dotted lines 304 in FIG. 17.

Lids made in accordance with this invention may be circular, oval or other suitable shapes, and may be used with containers formed of materials, e.g. glass or earthenware, that are different from the materials of the lid.

The invention may be applied to other walls of containers besides the lid. Plastics may be employed for the manufacture of the lid or other walls to which the invention is applied by using suitable methods of forming.

What I claim and desire to secure by Letters Patent is:
1. In a container wall formed of relatively thin sheet material, opening means comprising
 a runway;
 a slider opening device engageable therewith to slide therealong;
 a portion of the sheet material weakened along a line; and
 means provided on the slider opening device for parting the material of the wall along the weakened line as the slider opening device is slide along the runway.

2. A container wall according to claim 1 wherein the weakened portion is formed by a scored line.

3. A container wall according to claim 1 wherein the weakened portion is formed by a coined line.

4. A container wall according to claim 1 wherein the runway element is formed in the sheet material.

5. A container wall according to claim 1 wherein the means provided on the slider opening device comprise camming means engageable with the material of the wall in the region of the weakened portion to exert pressure thereon to part the material along the said line when the slider opening device is slid along the runway.

6. A container wall according to claim 5 having a shoulder on one side of the weakened portion of material to make said side more rigid and to assist in the parting action of the camming means.

7. A container wall according to claim 6 wherein the slider opening device comprises two parts comprising
 a first part having engagement means for engaging the runway;
 a second part hingeably connected to the first part forming a handle;
 camming means formed on the second part being engageable with the container wall when the handle is lifted so as to break the wall material at the weakened line and move into an operative position the slider opening device being movable along the runway with the camming means in the operative position to part the wall material along the remainder of the weakened line.

8. A container wall according to claim 7 wherein the slider opening device is formed from a single piece of sheet material.

9. A container wall according to claim 8 wherein the slider opening device is dimensioned so that the camming means in the operative position bears against the material of the wall in spaced relation to the weakened line so as to urge the material against the shoulder and shear the material at the line as the slider opening device is slid along the runway.

10. A container wall according to claim 1 wherein a portion of the wall weakened along a line adjacent the runway substantially encircles a portion of the wall so that after operation of the opening means, the said portion may be bent away from the remainder of the wall.

11. A container wall according to claim 5 wherein the runway encircles an openable portion of the wall and the weakened portion is formed inwardly of the runway adjacent thereto and also encircles the openable portion except for a narrow unweakened portion at one point, the camming means being arranged to engage the openable portion as the slider opening device is slid along the runway whereby when the material has been parted along the whole of the line, the camming means by pressure on the openable portion bends a part thereof into the container and a part on the opposite side of the said unweakened portion out of the container.

12. A contained wall according to claim 11 wherein a bead is formed in the material at the said unweakened portion which forms a stop for the slider opening device.

13. A container wall according to claim 5 wherein the runway and the weakened portion of the sheet material formed adjacently thereto encircles a removable portion of the wall, the camming means being arranged to exert pressure on the removable portion as the slider opening device is slid along the runway, pivoting means being provided below the weakened line so that when the material has been parted along a sufficient length of the line the camming means bends a part of the removable portion into the container on one side of the pivoting means and rotates the other part of the removable portion out of the container.

14. A circular container lid according to claim 9 formed of tinplate wherein the runway is formed by a peripheral channel encircling the lid, an inner wall of the channel providing the shoulder, a ledge formed at the top of said inner wall directed towards the opposite wall of the channel and partly closing the mouth of the channel forming engagement means for the slider opening device, the slider opening device having a wall for extending into the channel and a lip at an edge of said wall for engaging under said ledge when the slider opening device is assembled on the lid, said slider wall being guided between the ledge and the opposed wall of the channel as the slider is slid around the runway.

15. A contained wall according to claim 4 wherein a part of the runway element partially bounded by a weakened line formed in the material comprises an openable portion and the said means provided on the slider opening device is engageable with the openable portion to exert pressure thereon and part progressively the weakened line as the slider opening device is slid along the runway so that the openable portion is bent away from the remainder of the material.

16. A container wall according to claim 15 having a panel press formed in the wall, the panel and edges thereof forming the runway;
- a shoulder formed beneath the panel;
- a part of the panel forming said openable portion;
- a first part of the slider opening device being formed with opposed channel elements to engage the runway and slide therealong;
- a second part of the slider opening device forming a handle hingeably connected to the first part;
- camming means formed on the second part engageable with the openable portion of the panel when the handle is lifted about its connection with the first part to break through the weakened line by pressing the panel against the underlying shoulder whereupon the material may be parted along the remainder of the weakened line by moving the slider opening device along the runway element by hand.

17. A container wall according to claim 16 wherein the runway element has an extended portion of narrower width over which the channel elements of the first part of the slider opening device can be loosely clipped during manufacture of the lid and then slid along to engage the runway element.

18. A container wall according to claim 16 formed of tinplate.

References Cited
UNITED STATES PATENTS

| | | | |
|---|---|---|---|
| 3,176,871 | 4/1965 | Imerman | 220—48 |
| 3,250,424 | 5/1966 | Martin | 220—48 |

THERON E. CONDON, *Primary Examiner.*

G. T. HALL, *Assistant Examiner.*